United States Patent [19]

Smith et al.

[11] 4,239,802

[45] Dec. 16, 1980

[54] ANAEROBIC RESIN CURING SYSTEM

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 7,051

[22] Filed: Jan. 29, 1979

Related U.S. Application Data

[63] Continuation of Ser. No. 672,895, Apr. 2, 1976, abandoned.

[51] Int. Cl.³ .............................................. B05D 5/12
[52] U.S. Cl. .................................... 428/377; 427/118; 427/295; 427/341; 428/379; 428/432; 428/444; 428/454; 428/461
[58] Field of Search ............... 427/116, 118, 295, 577; 428/377, 379, 432, 444, 454, 461

[56] References Cited

U.S. PATENT DOCUMENTS

| | | | |
|---|---|---|---|
| 3,616,040 | 10/1971 | Toback | 156/310 |
| 3,844,834 | 10/1974 | Jerson | 427/377 X |
| 4,082,868 | 4/1978 | Schnedler et al. | 427/374 E |

*Primary Examiner*—Bernard D. Pianalto
*Attorney, Agent, or Firm*—R. D. Fuerle

[57] ABSTRACT

Anaerobic resins are cured in a gaseous atmosphere which does not contain oxygen. An insulated conductor is placed in a vacuum and is impregnated with an anaerobic resin under pressure. The conductor is then placed in a non-oxygen containing atmosphere, such as nitrogen, which cures the resin.

28 Claims, 2 Drawing Figures

ANAEROBIC RESIN CURING SYSTEM

This is a continuation of application Ser. No. 672,895, filed Apr. 2, 1976 and now abandoned.

BACKGROUND OF THE INVENTION

Conductors for use as coils in generators and motors are insulated using the VPI (vacuum-pressure impregnation) process by wrapping with mica tape, then with a glass binding tape to hold the brittle mica tape on. The wrapped conductor is placed in a vacuum then in a resin under pressure. It is removed and heated in an oven to cure the resin.

While this system is used commercially, it requires a great deal of energy for the baking ovens because the copper in the coils must be heated along with the resin. Run-off of the resin during cure can occur, and mechanical stresses in the resin can be induced by expansion of the copper during cure and its subsequent contraction during cooling.

Anaerobic resins are resins which will not cure in the presence of oxygen, but will cure when placed between two oxygen-impervious surfaces, and therefore they are commonly used as adhesives.

PRIOR ART

U.S. Pat. No. 3,539,438 discloses wrapping a conductor with mica paper and impregnating with a non-anaerobic acrylic resin.

Anaerobic resins are disclosed in U.S. Pat. Nos. 3,616,040; 3,634,379; 3,775,385; 3,855,040; 3,880,956; 3,041,322; 3,125,480; 3,203,941; 3,300,547; 3,419,512; 2,895,950; 3,043,820; 3,046,262; 3,218,305; 3,435,012; and 3,720,656.

SUMMARY OF THE INVENTION

We have found that insulated conductors impregnated with anaerobic resins will not cure in a vacuum, which is an advantage in the VPI process, but can be cured by contact with a gaseous atmosphere which does not contain oxygen. This means that the resins can be cured at room temperature, thus avoiding the problems previously encountered with heat-cured resins. Electrical properties are comparable to the heat-cured resins now in use, except at high voltages. Unlike electron beam and UV cured resins, anaerobic resins cured under a gas cure in depth, down to 6 inches or more.

DESCRIPTION OF THE INVENTION

Figure 1:
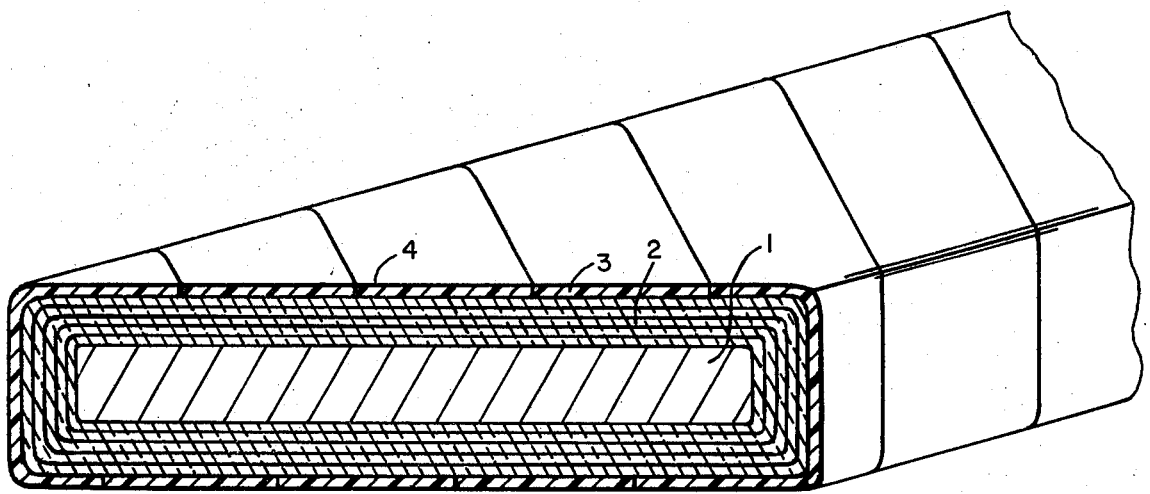
FIG. 1 is an isometric view in section of an insulated conductor impregnated with an anaerobic resin.

In FIG. 1, a conductor 1 is covered with several layers of mica tape insulation 2 and one layer of woven organic tape insulation 3, which holds the mica insulation in place. An anaerobic resin 4 impregnates the insulation and forms an outer coating.

Figure 2:
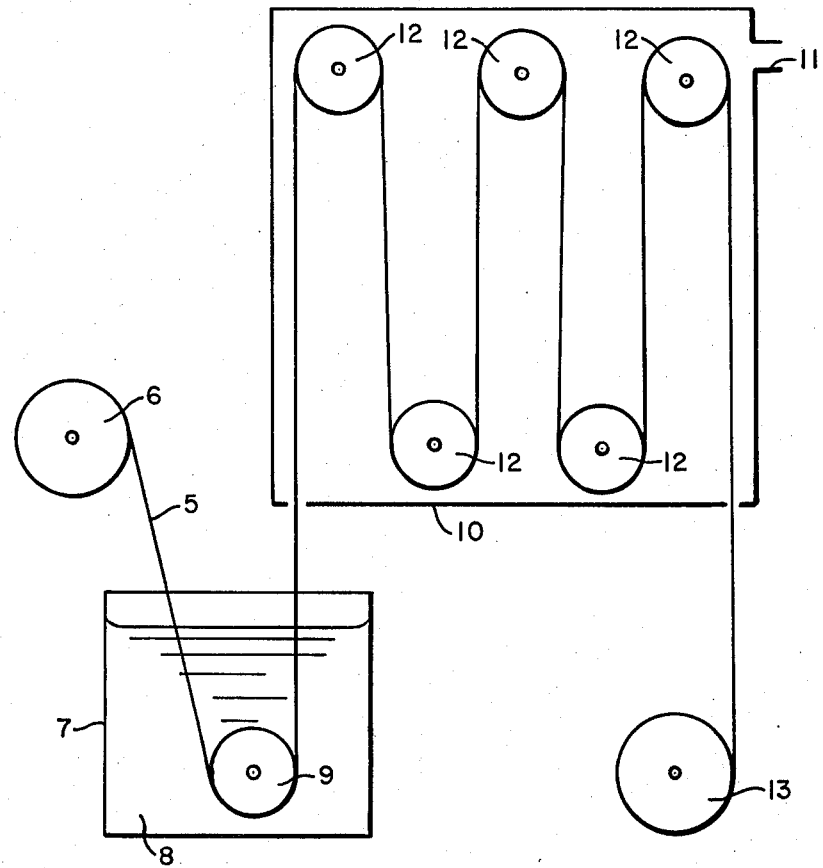
FIG. 2 is a diagram of an apparatus for continuously coating a wire using the curing system of the invention.

In FIG. 2, a conductor 5 passes from capstan 6 into bath 7 of an anaerobic resin 8. The wire then passes over sheave 9 into closed tank 10. An inert gas flows into the tank from conduit 11. As the wire passes over sheaves 12 in the tank it is cured, then leaves the tank and is wound on capstan 13.

An anaerobic resin is a resin which will not cure in the presence of oxygen, but will cure at room temperature when placed between suitable oxygen-impervious surfaces. Solventless anaerobic resins are required for the VPI process. Most anaerobic resins are acrylics, such as diacrylates, which polymerize by addition through a double bond. Commonly used acrylic anaerobic resins include tetraethylene glycol dimethacrylate and tetraethylene glycol diacrylate. An acrylic anaerobic resin may contain a reactive comonomer such as ethyl methacrylate, styrene, or 2-ethylhexyl acrylate. An organic peroxide free radical initiator such as cumene hydroperoxide or t-butyl perbenzoate is often used to initiate cure. An accelerator, usually a tertiary amine such as N,N-dimethyl-p-toluidine, and a coaccelerator, usually an organic sulfimide such as benzoic sulfimide, may be present to reduce curing time. The free radical initiator can be stabilized with a free radical stabilizer such as hydroquinone. The hereinbefore cited patents describe many anaerobic resins familiar to the art which may be used in this invention.

The conductor is preferably copper because it is most widely used for electrical insulation and it is known to accelerate the cure of anaerobic resins, though other metals can also be used.

The primary insulation is preferably mica, especially for high voltages, as it has excellent electrical properties. Glass, asbestos, Nomex (a polyamide believed to be made from meta phenylene diamine and isophthaloyl chloride, sold by Dupont), and other types of insulation could also be used, either alone, in mixtures, or in mixtures with mica. Mica insulation is usually made with a polyester backing to hold the mica together. The insulation may be a tape which is wrapped around the conductor, the amount of insulation depending upon the voltage drop across the insulation. Mica insulation is preferably impregnated with about 3 to 30% (preferably about 5 to about 12%, by weight based on the mica weight), of a polymer which is coreactive with the anaerobic resin, in order to insure a better bond. Polyesters, acrylics, polybutadienes, or other unsaturated monomers may be used as co-reactive resins.

The VPI process is the preferred method of insulating a conductor because it leaves very few air gaps in the insulation, but other methods may also be used. The wrapped conductor is placed in a tank which is then evacuated. The anaerobic resin is admitted under pressure, usually at least about 46 psi, though about 90 to about 100 psi is preferred. The resin should saturate the insulation. Typically, the insulation will contain about 5 to about 35% (by weight based on the insulation weight) of the anaerobic resin, though about 20 to about 30% is preferred. The resin is permitted to drain from the wrapped conductor and is cured by contact with a gas which does not contain any significant amount of oxygen. This may be accomplished in the same tank or the wrapped conductor may be cured in a separate tank. Nitrogen, carbon dioxide, or mixtures of these two gases is preferred as it is inexpensive, safe, and easy to handle, but other inert gases (other than oxygen) may also be used. It has been found that if nitrogen is used to cure an acrylic resin the rates of cure are optimum at a nitrogen flow rate of about 6 to about 20 lpm (liters per minute).

The following examples further illustrate this invention.

EXAMPLE I

The following table gives various anaerobic resin compositions which were prepared and tested for gel time and storage stability.

| Resin Number | Difunctional Acrylic Monomer (75 parts) | Vinyl Monomer (25 parts) | Catalyst, Cumene Hydroperoxide (parts) | N,N Dimethyl-p-Toluidine (parts) | Coaccelarator, Bansoic Sulfimide (parts) | Inhibitor, Hydroquinone (parts) | Viscosity at 25° C. (cps) | Gel Time in $N_2$ at 25° C. (hours) | Storage Stability in Air at 25° C. (days) |
|---|---|---|---|---|---|---|---|---|---|
| 1 | Tetraethylene Glycol Dimethacrylate | Styrene | 2.0 | 0.4 | 0.30 | 0.04 | 3.0 | 8–16 | >100 |
| 2 | Same | Styrene | 2.0 | 0.4 | 1.00 | 0.04 | 3.0 | 5–6 | 48 |
| 3 | Same | Styrene | 2.0 | 0.4 | 3.00 | 0.04 | 3.0 | 3–4 | >100 |
| 4 | Same | Styrene | 2.0 | 1.0 | 0.30 | 0.04 | 3.0 | 8–16 | 56 |
| 5 | Tetraethylene Glycol Diacrylate | Styrene | 2.0 | 0.4 | 0.30 | 0.04 | 3.0 | 2–3 | 15 |
| 6 | Same | 2-Ethyhexyl Acrylate | 2.0 | 0.4 | 0.30 | 0.04 | 0.5 | 3–4 | >100 |
| 7 | Same | | | 0.4 | 0.30 | 0.04 | 0.5 | 4–5 | >100 |
| 8 | Same | Ethyl Methacrylate | 2.0 | 0.4 | 0.30 | 0.04 | 0.5 | <1.0 | >100 |
| 9 | Same | Styrene | 2.0 | 0.4 | 0.30 | 0.08 | 3.0 | 4–5 | >100 |
| 10 | Same | Ethyl Methacrylate | 2.0 | 0.4 | 0.30 | 0.08 | 0.5 | <1.0 | >100 |
| 11 | Same | Ethyl Methacrylate | 2.0 | 0.4 | 0.30 | 0.16 | 0.5 | 1–2 | >100 |

Samples of the above resins were limited to about 50 gms due to the high exotherm produced during cure. The storage stability tests, which determine storage time until visual gelling occurs, were carried out on samples of about 50 g of resin stored in 4 oz. glass jars or polyethylene containers. Because of the uncertain effects of the fluorescent lighting in the laboratory on the resin stabilities, the samples were stored in the dark. Periodically, gel times were run (under $N_2$ flow) on the samples to check for retention of cure reactivity during storage.

The gel time measurements (i.e., time required for visual gelling to occur) were made on 10 g samples in 2 inch diameter aluminum dishes. It was found that the ordinary laboratory vacuum was insufficient to gel the samples within a reasonable time. However, rapid gelation was achieved by placing the samples in a desiccator and passing nitrogen through the desiccator. The following table gives the results of testing resin number 10.

| Cure Condition | Gel Time at 25° C. |
|---|---|
| Air | 48 hours |
| $N_2$ stream (13 lpm) | 30 to 60 minutes |
| Vacuum | 24 hours |

At the end of 24 hours, a very small amount of gel (about 7% of the resin) was observed at the bottom of the aluminum dish of the sample placed in the vacuum.

The following table gives the results of similar tests performed on resin number 9.

| Cure Condition | Gel Time at 25° C. |
|---|---|
| $CO_2$ (13 lpm) | 20 minutes |
| $N_2$ (50 psi static) | 7 to 8 hours |
| Air (13 lpm) | >2 days |
| $O_2$ (13 lpm) | >2 days |

Pressurized $CO_2$ at 50 psi also produced a rapid cure. Static nitrogen or carbon dioxide under pressure results in a slower cure than does a flow of nitrogen or carbon dioxide at atmospheric pressure, but requires smaller quantities of gas.

Using a similar procedure, the effect of the nitrogen flow rate on resin number 9 was determined. The following table gives the results.

| Flow Rate (lpm) | Gel Time (hours) |
|---|---|
| 1.62 | 7.5 |
| 3.25 | 4.0 |
| 6.50 | 2.0 |
| 13.0 | 1.5 |
| 20.0 | 3.0 |
| 26.0 | 4.0 |

The above table shows that a flow rate of about 6 to about 20 lpm is critical to obtaining a rapid cure at pressure of about one atmosphere.

EXAMPLE II

Power factor data were obtained on mica composites impregnated with the most promising anaerobic resins, resin numbers 8 and 9. Two types of composite were prepared, one (sample A) was made by brushing an anaerobic resin on a piece of "raw" mica paper ("Cogemica" sold by Cogebi Co.), (4 in. × 4 in.) about 20 mils thick, and the other type of sample (sample B) was fabricated by brushing the anaerobics over a polyester-impregnated mica tape wrapped 6 layers thick (i.e., 3 wrappings half-lapped) on copper tubes (8 in. long, 0.5 in. od). Because of the very fluid nature (<3.0 cps) of these anaerobic resins it was observed that rapid and thorough penetration of these mica products occurred.

The samples were gelled under a stream of $N_2$ (13.0 liters/min.) at room temperature and it was noted that the copper tube samples exhibited rapid gel under these conditions (i.e. <30 min.). To establish the extent of cure of the anaerobic resins in these composites and the necessity (or not) for a heat post-treatment of these materials, it was decided to bake one set of these samples for 4 hours at 135° C. after the initial room temperature cure. It was felt that a comparison of the electrical data obtained from these two sets of samples would determine whether or not an additional heat treatment is necessary to obtain full cure with these anaerobic materials.

Power factor measurements were recorded at 25° C. and 150° C. The copper tube samples were also measured at 1, 1.5, and 2 kV at both temperatures to evaluate the effect of voltage on the power factors of these mica composites.

Power factor data obtained with copper tubes wrapped with the Sample B mica tape and impregnated with two of the anaerobic resins are shown in the following table.

| Resin | Temperature (°C.) | Heat Cure? (4 hours at 135° C. | % Power Factor (100 × tanδ) Applied Voltage | | |
|---|---|---|---|---|---|
| | | | 1.0 | 1.5 | 2.0 |
| 9 | 25 | No | 2.10 | 2.16 | 2.71 |
| | | Yes | 2.3 | 2.32 | 2.59 |
| | 150 | No | 31.4 | 32.4 | 35.8 |
| | | Yes | 28.3 | 28.9 | 31.9 |
| 8 | 25 | No | 2.32 | 2.32 | 2.5 |
| | | Yes | 2.48 | 2.49 | 2.52 |
| | 150 | No | 27.9 | 28.9 | 31.1 |
| | | Yes | 34.2 | 35.7 | 37.7 |

The results for resin number 9 at 150° C. show that the sample, which did not have any heat treatment after the initial cure, has slightly higher power factor values than the sample which had heat treatment. However, both samples showed similar power factor values at 25° C.

For resin number 8, the sample with the additional heat treatment exhibits somewhat higher power factor values at 150° C. than the sample that did not have the additional cure. The room temperature values for both samples, however, remain the same. It is difficult, on the basis of these data, to say whether an additional heat postcure is necessary for these anaerobic materials to achieve full cure. Nevertheless, it may be significant that all four samples showed very similar room temperature power factor values.

Although no attempt was made to identify the optimum mica tape for these anaerobic impregnants, the power factor value in these composites using the Sample B mica tape are not considered to be excessively high. Although the values (i.e. 32–37% at 150° C. and 2 kV) would be unacceptably high for high voltage applications, they would be suitable for low voltage equipment insulation (e.g., <13.8 kV).

Dielectric strength measurements were carried out on mica composites made with Sample A impregnated with resin number 8. The samples were tested under an aliphatic hydrocarbon transformer oil sold by Westinghouse Electric Corporation under the trademark "WEMCO C" at room temperature using a voltage rise of 1 kV/sec. Power factor and dielectric constant data obtained with the Sample A composites using resin number 10 are summarized in the following table.

| Test Temperature (°C.) | Cure Conditions | Capacitance | Power Factor % (100 × tan δ) | Dielectric Constant (E') |
|---|---|---|---|---|
| | 16 hrs at 25° C. under N₂ | 36.3 | 0.89 | 3.4 |
| 25 | Same + 4 hrs at 135° C. in air | 58.4 | 1.6 | 5.2 |
| | 16 hrs at 25° C. under N₂ | 138.6 | 4.8 | 12.9 |
| 150 | Same + 4 hrs at 135° C. in air | 94.2 | 23.0 | 8.4 |

Once again there appears to be an interesting difference between the sample which had the additional heat treatment and the one that did not. The power factor of the room temperature cured sample, measured at 150° C. was much lower than that of the other one. The reasons for these differences are not very clear at this time; however, both samples would be considered as having acceptably low power factor and dielectric constant values for insulation up to a voltage of about 13.8 kV.

The following table shows the dielectric strength for the two samples used in the previous table. The measurements were made at an N₂ flow rate of 13.0 lpm under "WEMCO C" oil at 25° C. using a voltage rise of 1 kV/sec. Both composite samples were used in the previous power factor measurements and probably experienced 1 hour at 150° C. before being tested for dielectric strength.

| Cure Condition | Composite Thickness (mils) | Breakdown Voltage (kV; rms) | Dielectric Strength (volts/mil) |
|---|---|---|---|
| Overnight (16 hours) at 25° C. in N₂ stream | 21 | 16.0 | 765 |
| Same + 4 hours at 135° C. in air | 20 | 16.5 | 830 |
| Same + 4 hours at 135° C. in air | 20 | 18.5 | 935 |

The sample which had the additional elevated temperature cure would appear to have somewhat higher dielectric strength than the room temperature cured sample. However, both composites would seem to have higher dielectric strengths than those of epoxy resin impregnated mica composites of similar thicknesses. Typically, the epoxy-mica composites show values of 400–600 volts/mil compared with 700–900 volts/mil for the anaerobic resin samples.

EXAMPLE III

To illustrate the importance of curing these resins under a stream of N₂, the following experiment was carried out. Four copper tubes were wrapped with Sample B mica tape as described previously. One set (2) of these samples was impregnated with resin number 5 and the other with resin number 8. One of each set was allowed to cure in an N₂ stream (flow rate 13 lpm) for 32 hours, then both sets were left in air for two weeks. The cure conditions and resin retention for each of these samples is shown in the following table.

| Sample No. | Resin Number | Copper Tube Weight (g) | Wrapped Copper Tube Weight (g) | Cure Conditions | Weight After Impregnation | Resin Retention (g) | % Resin Retention On Mica |
|---|---|---|---|---|---|---|---|
| B1 | 5 | 58.97 | 69.38 | Air | 70.25 | 0.87 | 8.35 |
| B2 | 5 | 56.56 | 67.13 | $N_2$ | 68.18 | 1.05 | 10.00 |
| B3 | 8 | 57.79 | 67.93 | $N_2$ | 69.06 | 1.13 | 11.15 |
| B4 | 8 | 56.90 | 67.23 | Air | 68.36 | 1.13 | 10.92 |

The resins had been stored two months at room temperature in polyethylene bottles prior to being used. The resin "run-off" from the samples cured under $N_2$ was found to be negligible.

Power factor measurements at 1 kV were then carried out on these four samples at 25° C. The results are shown in the following table.

| Sample No. | Power Factor (100 × tan δ) at 60 Hz | | |
|---|---|---|---|
| | At 25° C. | At 150° C. after 3 days at 150° C. | At 25° C. after 3 days at 150° C. |
| B1 | 25.6 | 30.2 | 1.4 |
| B2 | 3.5 | 23.1 | 1.2 |
| B3 | 4.5 | 25.8 | 1.8 |
| B4 | 32.8 | 23.9 | 1.8 |

Samples B2 and B3, which had been allowed to cure in the $N_2$ stream, showed much lower power factor values than the ones which had been left in air. This was not too surprising since the latter two samples were still very tacky, even after two weeks. The others were firm and tack-free after a few hours in $N_2$.

To illustrate this lack of cure in Samples B1 and B4, all four specimens were postcured 3 days at 150° C. and the power factors remeasured at 25° C. and also at 150° C. These data are also shown in the above table. At room temperature all four samples gave similar values (between 1.2% and 1.8%) and also at 150° C. (23.1 to 30.2%).

Thus, the indication is that the samples exposed to the $N_2$ stream were more fully cured than the ones left in air.

For a typical Class F motor, an additional heat treatment of the materials would not appear to be necessary since full cure could be obtained after the coils have been wound into a stator because the operating temperature of the motor would be high enough to bring about a full cure.

Also, the winding of partially cured coils (assuming resin is non-tacky) might be advantageous since the mica insulation would still retain an appreciable degree of flexibility. Conventionally made coils are sometimes stiff and difficult to wind without cracking the insulation.

We claim:

1. An article comprising a conductor covered with insulation which is impregnated with a cured anaerobic resin.

2. An article according to claim 1 wherein said insulation is selected from the group consisting of mica, glass, asbestos, organic resins, and mixtures thereof.

3. An article according to claim 2 wherein said insulation is mica.

4. An article according to claim 1 wherein said insulation contains about 3 to about 30% (by weight based on said insulation weight) of an organic resin co-reactive with said anaerobic resin.

5. An article according to claim 1 wherein said anaerobic resin is an acrylic resin.

6. An article according to claim 5 wherein said acrylic resin is modified with styrene.

7. An article according to claim 1 wherein the amount of said anaerobic resin is about 5 to 35% (by weight based on the weight of said insulation).

8. An article according to claim 1 wherein said conductor is copper.

9. A method of forming a cured, resinous coating on an article comprising applying an anaerobic resin to said article in the presence of oxygen, and placing said article in a gaseous atmosphere which does not contain oxygen.

10. A method according to claim 9 wherein said gaseous atmosphere is selected from the group consisting of nitrogen, carbon dioxide, and mixtures thereof.

11. A method according to claim 9 wherein said anaerobic resin is an acrylic resin.

12. A method according to claim 9 wherein said article is a conductor covered with insulation.

13. A method according to claim 12 wherein said insulation is mica and said conductor is copper.

14. A method according to claim 12 wherein said insulated conductor is placed in a vacuum, then immersed into said anaerobic resin under pressure.

15. A method according to claim 14 wherein said pressure is about 45 to about 100 psi.

16. A method of continuously insulating wire comprising passing said wire through an anaerobic resin, thence through a gaseous atmosphere which does not contain oxygen.

17. A method according to claim 16 wherein said gaseous atmosphere is selected from the group consisting of nitrogen, carbon dioxide, and mixtures thereof.

18. A method according to claim 16 wherein anaerobic resin is an acrylic resin.

19. A method according to claim 16 wherein said anaerobic resin is solventless.

20. A method according to claim 16 wherein said anaerobic resin includes an accelerator.

21. A method according to claim 20 wherein said accelerator is benzoic sulfimide.

22. An article according to claim 1 wherein said conductor is a wire.

23. An article according to claim 1 wherein said conductor is a motor or generator coil.

24. A method according to claim 9 wherein said anaerobic resin is solventless.

25. A method according to claim 9 wherein said anaerobic resin includes an accelerator.

26. A method according to claim 25 wherein said accelerator is benzoic sulfimide.

27. A method according to claim 9 wherein said conductor is a motor or generator coil.

28. A method according to claim 9 or 11 wherein said gaseous atmosphere which does not contain oxygen is nitrogen at a flow rate of about 6 to about 20 liters per minute.

* * * * *